(12) United States Patent
Schiødt

(10) Patent No.: US 8,404,156 B2
(45) Date of Patent: Mar. 26, 2013

(54) PROCESS FOR OPERATING HTS REACTOR

(75) Inventor: Niels Christian Schiødt, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 113 days.

(21) Appl. No.: 13/000,578

(22) PCT Filed: Jun. 15, 2009

(86) PCT No.: PCT/EP2009/004288
§ 371 (c)(1),
(2), (4) Date: Dec. 21, 2010

(87) PCT Pub. No.: WO2010/000387
PCT Pub. Date: Jan. 7, 2010

(65) Prior Publication Data
US 2011/0101279 A1   May 5, 2011

(30) Foreign Application Priority Data
Jul. 3, 2008  (DK) ................................. 2008 00935

(51) Int. Cl.
*C01B 3/38* (2006.01)
*C01B 3/24* (2006.01)

(52) U.S. Cl. ....................................... 252/373; 423/650
(58) Field of Classification Search .................. 252/373
See application file for complete search history.

(56) References Cited

U.S. PATENT DOCUMENTS

| 5,030,440 A | 7/1991 | Lywood et al. |
| 6,627,572 B1 * | 9/2003 | Cai et al. ......................... 502/84 |
| 2004/0105804 A1 | 6/2004 | Lee et al. |

FOREIGN PATENT DOCUMENTS

| CN | 1039774 A | 2/1990 |
| EP | 1 149 799 A1 | 10/2001 |
| FR | 2 567 866 A1 | 1/1986 |
| JP | 2004-321924 A | 11/2004 |

OTHER PUBLICATIONS

Translation of FR2567866, Jan. 1986.*

* cited by examiner

*Primary Examiner* — Melvin C Mayes
*Assistant Examiner* — Kenneth Vaden
(74) *Attorney, Agent, or Firm* — Dickstein Shapiro LLP

(57) ABSTRACT

Process for enriching a synthesis gas in hydrogen by conversion of carbon monoxide and steam over a catalyst containing oxides of zinc and aluminum together with one or more promoters.

2 Claims, No Drawings

PROCESS FOR OPERATING HTS REACTOR

The present invention relates to an improved process for the production of hydrogen by the reaction of carbonaceous resources with steam and/or oxygen. In particular, the invention provides a method for carrying out the high water gas shift reaction in a synthesis gas with a reduced content of steam. The invention relates also to the use of a catalyst containing oxides of zinc and aluminum together with one or more promoters in a high temperature shift (HTS) reactor operating at conditions in which the synthesis gas entering the reactor has a specific range of oxygen to carbon molar ratio (O/C-ratio) of 1.69 to 2.25. The promoters are selected from Na, K, Rb, Cs, Cu, Ti, Zr, rare earth elements and mixtures thereof.

Hydrogen production from natural gas, oil, coal, coke, naphtha and other carbonaceous resources is typically carried out via the steam reforming, autothermal reforming or gasification reactions. In any of these reactions a stream of synthesis gas (syngas) is produced. The syngas contains hydrogen, carbon monoxide, carbon dioxide, water and sometimes nitrogen as the major components. In order to decrease the CO-content of the gas and to maximize the hydrogen yield it is customary to convert the synthesis gas further by means of the water gas shift reaction $CO+H_2O=CO_2+H_2$.

In order for this reaction to proceed at a feasible rate the syngas is converted over a suitable catalyst in a reactor. The water gas shift reaction is an equilibrium limited, exothermic reaction. The hydrogen yield can therefore be optimized by carrying out the reaction in two separate adiabatic reactors with inter-stage cooling. The first of these reactors is commonly designated as a high-temperature shift (HTS) reactor containing a high-temperature shift catalyst, and the second as a low-temperature shift (LTS) reactor containing a low-temperature shift catalyst. Some industrial plants are designed with a high-temperature shift reactor only.

A synthesis gas will always have some potential for the formation of hydrocarbons especially methane by the reaction $CO+3H_2=CH_4+H_2O$. This methanation reaction consumes hydrogen and its occurrence in the shift reactors must be suppressed. In current industrial practice this reaction is suppressed by proper choice of reaction conditions. The state of the art high temperature shift (HTS) catalyst is based on oxides of iron and chromium with or without promoters. This catalyst limits the operating conditions since a certain surplus of steam relative to the stoichiometry of the shift reaction must be present in order to maintain a sufficiently high selectivity of the catalyst for the high temperature water gas shift reaction relative to the formation of hydrocarbons. This surplus of steam is typically injected upstream the high temperature shift reactor and causes additional cost to the operation of the plant. This is so because energy is needed to evaporate liquid water and heat the thus formed steam to the reaction temperature.

JP patent application No. 2004-321924 (JP 2004321924A) describes a copper-alkali metal catalyst for the water gas shift reaction supported on zinc-aluminum oxides. Copper is the active catalyst, while the zinc-aluminum oxide acts only as the carrier. The catalyst was tested at 400° C. and at atmospheric pressure corresponding probably to conditions in the automotive industry but well outside the industrial HTS operating ranges of 2.3-6.5 MPa. The treated gas is said to contain 9 vol % $CO_2$, 31 vol % $N_2$, 23 vol % $H_2O$ and 8 vol % CO.

In article "Higher alcohol synthesis reaction study using K-promoted ZnO catalysts III" [G. B. Hoflund, W. S. Epling and D. M. Minahan *Catalysis Letters* Vol 45 (1997) pp 135-138] the authors find that a zinc oxide catalyst produces significant amounts of hydrocarbons from a synthesis gas at elevated temperatures and pressures. The authors found that although K-promotion somewhat inhibits the formation of hydrocarbons they could not be completely suppressed.

The present invention provides a process for reducing the excess of water used in high-temperature shift (HTS) reactors for the production of hydrogen thus reducing the operational and energy costs connected to the evaporation and heating of the steam.

The present invention provides a high temperature shift process of a synthesis gas which enables operation at low steam to carbon molar ratios (S/C-ratio)—or equivalently low steam to dry gas molar ratios (S/G-ratio) or low oxygen to carbon molar ratios (O/C-ratio)—in said synthesis gas while at the same time suppressing hydrocarbon by-product formation, particularly methane formation.

Thus, we have surprisingly found that the surplus of steam can be greatly reduced without causing excessive hydrocarbon formation and without build-up of pressure in the high temperature shift reactor by using promoted zinc-aluminum oxide based catalysts. By using a zinc spinel catalyst instead of an iron oxide based catalyst the formation of hydrocarbons that would normally follow from operation with reduced amounts of steam in the synthesis gas is avoided.

It should be noted that the S/C-ratio and the S/G-ratio are parameters will change during conversion, and thus in the reactor, since steam is a reactant in the water gas shift reaction. Contrary, the O/C-ratio does not change during conversion. It is defined as O/C-ratio=$(n_{CO}+2n_{CO2}+n_{H2O})/(n_{CO}+n_{CO2}+n_{CH4})$ at the inlet or at any point in the reactor, where e.g. $n_{CO}$ is the molar concentration of CO in the gas. We prefer describing the reduction potential of the gas by the O/C-ratio. In some cases corresponding values of S/G-ratio and S/C-ratio of the inlet gas to the HTS reactor (before conversion) are given.

Accordingly, we provide a process for enriching a synthesis gas in hydrogen, said synthesis gas containing hydrogen, carbon monoxide and steam by conversion of carbon monoxide and steam over a catalyst where said synthesis gas has an oxygen to carbon molar ratio of 1.69 to 2.25 and wherein said catalyst contains oxides of zinc and aluminum together with one or more promoters, and wherein the conversion of the carbon monoxide and steam is conducted under high temperature shift conditions where the synthesis gas has a temperature of 300° C. to 400° C. and the pressure is 2.3 to 6.5 MPa.

For instance, an O/C-ratio of 1.65 corresponds to S/C-ratio of 0.27 in the synthesis gas entering the shift reactor.

By the invention it is possible to maintain in a high temperature shift reactor a ratio between produced hydrogen and produced methane of above 100.

The invention is also directed to the use of a catalyst containing oxides of zinc and aluminum together with one or more promoters in a shift reactor, preferably a high temperature shift (HTS) reactor operating at conditions in which the synthesis gas entering the reactor has an oxygen to carbon molar ratio (O/C-ratio) of 1.69 to 2.25 for suppression of hydrocarbon by-product formation particularly for suppression of methane by-product formation via the methanation reaction ($CO+3H_2=CH_4+H_2O$).

The finding of the present invention is particularly surprising in view of the above article by G. B. Hoflund et al.: the authors found for example that at 400° C. and 6.9 MPa, a ZnO catalyst containing 1% K produced 7 g hydrocarbons per kg catalyst per hour. Under comparable conditions Catalyst A of the present invention as described below produced only 0.16 g methane per kg catalyst per hour, while other hydrocarbons were produced in amounts below the detection limit.

High temperature shift operation with low water content in the synthesis gas is thus now possible without resulting in unwanted hydrocarbon formation such as methane formation. Lower S/C ratios may thus be used in the reforming section upstream the HTS reactor, thereby significantly increasing the energy efficiency of the plant and reducing equipment size. Particularly for ammonia plants, a lower S/C ratio in the reforming section and thereby at the inlet of the HTS reactor manifests itself also in lower energy consumption during $CO_2$-wash in the ammonia synthesis section of the plant.

We have also found that the energy efficiency of a plant comprising high temperature shift, such as a hydrogen plant, is particularly improved by operating with O/C-ratio values in such specific range of 1.69 to 2.25. By energy efficiency is meant the specific net energy consumption used in the plant (SNEC, Gcal/1000 $Nm^3$ $H_2$) given by the energy amount of the feed+fuel−steam.

In another embodiment of the invention the synthesis gas has an oxygen to carbon molar ratio of 1.69 to 2.00 such as 1.97 or 1.98.

Preferably, the promoters are selected from Na, K, Rb, Cs, Cu, Ti, Zr, rare earth elements and mixtures thereof. More preferably, the promoters are selected from Na, K, Rb, Cs, Cu and mixtures thereof.

In a preferred embodiment the catalyst comprises in its active form a mixture of zinc alumina spinel and zinc oxide in combination with a promoter in the form of an alkali metal selected from the group consisting of Na, K, Rb, Cs and mixtures thereof, said catalyst having a Zn/Al molar ratio in the range 0.5 to 1.0 and a content of alkali metal in the range 0.4 to 8.0 wt % based on the weight of oxidized catalyst. Particularly suitable catalysts contain for instance 34-37 wt % Zn and 22-26 wt % Al and 1-2 wt % of alkali promoter in the form of K.

The synthesis gas entering the HTS-reactor contains normally 5-50 vol % CO, 5-50 vol % $CO_2$, 20-60 vol % $H_2$, 15-50 vol % $H_2O$, 0-30 vol % $N_2$.

EXAMPLES

Example 1

Catalyst A was prepared as follows. A one molar solution of potassium aluminate in water was prepared. The solution was stabilized with excess potassium hydroxide in a one to one molar ratio. Another solution was prepared by dissolving 178.5 g of zinc nitrate hexahydrate in deionized water and adjusting the volume to 1 liter. The two solutions were mixed together causing a precipitate to form. The slurry was ripened at 95° C. for one hour after which pH was adjusted to 8 by the addition of 10% nitric acid. The precipitate was filtered off, washed repeatedly with hot water and dried at 100° C. followed by calcination at 500° C. for two hours. The resulting powder was characterized by XRD showing a mixture of $ZnAl_2O_4$ (spinel) and ZnO. The powder was impregnated with a solution of $K_2CO_3$ in water by the incipient wetness method and dried at 100° C. Elemental analysis was done by the ICP method and showed the catalyst to contain 36.1% Zn, 25.1% Al and 1.2% K. The molar Zn/Al ratio was thus 0.59. The powder was mixed with graphite (4% wt/wt) and pelletized to give cylindrical tablets, 4.5 mm diameter by 4.5 mm height, density 2.10 g/cm3. Finally, the pellets were calcined two hours at 550° C.

Catalyst A was tested as follows. The catalyst, in the amount 50.2 g, was loaded into a copper-lined tubular reactor with ID=19 mm. The total gas flow was 214 Nl/h corresponding to an inlet flow of carbon monoxide of $F(in)_{co}$=1.32 mol/h. The temperature was kept constant within ±3° C. The reactor was heated by three external electrical heaters. The temperature was recorded by internal thermocouples. The highest temperature observed throughout the catalyst bed, $T_{max}$, was 395° C. The reactor was pressurized to the reaction pressure P in synthesis gas. Syngas (synthesis gas), dosed by a Bruckner mass flow controller, and steam, dosed by a Knauer pump, were preheated and mixed before passing over the catalyst. The dry gas composition was approximately 15% CO, 10% $CO_2$, 72% $H_2$ and 3% Ar. The steam/gas molar ratio (S/G) was 0.07 corresponding to an oxygen/carbon molar ratio (O/C) of 1.69. The concentration of all components was regularly measured in both inlet and dry exit gas by means of a Hewlett Packard Gas Chromatograph calibrated towards a gas mixture of known composition. Mass balances were recorded for C, H and O and found to be within 1.00±0.03 in all cases.

Table 1 records the inlet and exit flow of carbon monoxide, $F(in)_{co}$ and $F(ex)_{co}$, the consumption of carbon monoxide $\Delta F_{co}=F(in)_{co}-F(ex)_{co}$, and the exit flows of methanol and methane, $F(ex)_{MeOH}$ and $F(ex)_{CH4}$, respectively.

Examples 2-6

The catalyst was subject to varying S/G ratios, temperatures and pressure and the methanol and methane formation was recorded for each set of conditions. The results are listed in Table 1.

Example 7

As a comparative example a Cu/Cr/Fe catalyst (Catalyst Cl containing 1.5 wt % Cu, 6.0% Cr, 63.5% Fe and shaped as cylindrical tablets 6×6 mm) was tested as shift catalyst for the conversion of a synthesis gas with a relatively low O/C ratio of 2.25 (corresponding to S/G ratio=0.17). The test procedure was as described in Example 1 apart from using a smaller reactor with ID=7 mm and a smaller amount of catalyst namely 10.1 g. Despite the low pressure of 2.3 MPa and a low catalyst amount very high methane production was observed.

TABLE 1

Selectivity of catalyst of the invention and comparable catalyst at low steam contents of the gas

| Ex | Catalyst | Amount gram | S/G | S/C | O/C | $F(in)_{CO}$ Mol/h | $F(ex)_{CO}$ Mol/h | $\Delta F_{CO}$ Mol/h | $F(ex)_{MeOH}$ Mol/h | $F(ex)_{CH4}$ Mol/h | Tmax ° C. | P MPa |
|---|---|---|---|---|---|---|---|---|---|---|---|---|
| 1 | A | 50.2 | 0.07 | 0.27 | 1.69 | 1.320 | 1.054 | 0.266 | 0.027 | 0.0010 | 395 | 6.5 |
| 2 | A | 50.2 | 0.14 | 0.56 | 1.97 | 1.336 | 0.803 | 0.533 | 0.019 | 0.0010 | 403 | 6.5 |
| 3 | A | 50.2 | 0.14 | 0.57 | 1.98 | 1.313 | 0.781 | 0.532 | 0.019 | 0.0004 | 402 | 6.5 |
| 4 | A | 50.2 | 0.17 | 0.85 | 2.25 | 2.655 | 1.460 | 1.195 | 0.008 | <0.001 | 412 | 6.5 |
| 5 | A | 50.2 | 0.60 | 2.41 | 3.81 | 0.672 | 0.113 | 0.559 | <0.001 | <0.001 | 406 | 2.3 |

TABLE 1-continued

Selectivity of catalyst of the invention and comparable catalyst at low steam contents of the gas

| Ex | Catalyst | Amount gram | S/G | S/C | O/C | $F(in)_{CO}$ Mol/h | $F(ex)_{CO}$ Mol/h | $\Delta F_{CO}$ Mol/h | $F(ex)_{MeOH}$ Mol/h | $F(ex)_{CH4}$ Mol/h | Tmax °C | P MPa |
|---|---|---|---|---|---|---|---|---|---|---|---|---|
| 6 | A | 50.2 | 0.00 | 0.00 | 1.39 | 0.671 | 0.693 | −0.022 | *NM | 0.0016 | 387 | 6.5 |
| 7 | C1 | 10.1 | 0.17 | 0.85 | 2.25 | 0.428 | 0.175 | 0.253 | *NM | 0.14 | 410 | 2.3 |

*NM = Not Measured

Examples 8-11

Catalysts with various promoters were prepared by impregnation of the $ZnAl_2O_4$/ZnO powder described in Example 1 with aqueous solutions of salts of copper and/or potassium by the incipient wetness method. In the case of copper the nitrate salt was used, while in the case of potassium, potassium carbonate was used. The resulting powder was dried, calcined, mixed with graphite and shaped as tablets as described in Example 1. The promoted catalysts may also be prepared by co-precipitation of the promoter together with zinc and alumina. Table 2 lists the compositions by wt % of catalysts A, B, C and D of the present invention. The catalysts C and D contain less than 500 ppm K.

The catalysts A, B, C and D were shaped as cylindrical tablets 4.5 mm diameter×6 mm height. The test procedure was as follows. The catalyst, in an amount of 1-3 g, was loaded into a copper-lined tubular reactor with ID=5.4 mm in such way that the pellets were separated from each other by a 5 mm diameter sphere of dead-burned alumina. The reactor was heated by an external heating device to the reaction temperature which was T=391° C. The temperature was kept constant within ±3° C. The reactor was pressurized to the reaction pressure of P=2.5 MPa in synthesis gas. Syngas, dosed by a Bruckner mass flow controller, and steam, dosed by a Knauer pump, were preheated and mixed before passing over the catalyst. The total flow was adjusted to obtain a mass-space velocity (SV) of close to 50000 Nl/kg/h. With a catalyst loading of 2 g this corresponds to a flow rate of F=100 Nl/h. The syngas vol. composition was typically 10.2% CO, 6.8% $CO_2$, 33.8% $H_2O$, 47.2% $H_2$ and 2.0% Ar corresponding to an S/G-ratio of 0.51. The Ar was used as an internal standard. The concentration of all components was regularly measured in both inlet and dry exit gas by means of a Hewlett Packard Gas Chromatograph which had been calibrated towards a gas mixture of known composition. Mass balances were recorded for C, H and O and found to be within 1.00±0.03 in all cases. In all cases the catalyst was operated 60 hours at the specified conditions before the rate was recorded.

TABLE 2

Rate of CO-conversion over catalysts of the invention at 2.5 MPa, 391 ± 3° C., S/G =0.51

| Example | Catalyst | % Zn | % Al | % K * | % Cu | SV Nl/kg/h | Rate Mole/kg/h |
|---|---|---|---|---|---|---|---|
| 8 | A | 36.1 | 25.1 | 1.2 | — | 54000 | 54 |
| 9 | B | 35.5 | 25.1 | 1.2 | 5.0 | 49200 | 75 |
| 10 | C | 34.4 | 24.0 | — | 0.5 | 53100 | 68 |
| 11 | D | 38.6 | 22.9 | — | — | 71400 | 22 |

* Catalysts not impregnated with $K_2CO_3$ contain residual K which is less than 500 ppm.

Table 2 lists the activity of catalysts A, B, C and D showing the effect of the various promoters. After recording the rate of CO-conversion in the wet gas, the steam flow was reduced to zero while maintaining the temperature and pressure over the reactor. In all cases methane formation was below 0.1 g per kg catalyst per hour.

The invention claimed is:

1. A process for enriching a synthesis gas in hydrogen, said synthesis gas containing hydrogen, carbon monoxide and steam comprising conversion of carbon monoxide and steam over a catalyst where said synthesis gas has an oxygen to carbon molar ratio of 1.69 to 2.25 and wherein said catalyst contains oxides of zinc and aluminum together with one or more promoters, and wherein the conversion of the carbon monoxide and steam is conducted under high temperature shift conditions where the synthesis gas has a temperature of 300° C. to 400° C. and the pressure is 2.3 to 6.5 MPa, and wherein the catalyst comprises in its active form a mixture of zinc alumina spinel and zinc oxide in combination with a promoter selected from the group consisting of Na, K, Rb, Cs, Cu, Ti, Zr and mixtures thereof and mixtures thereof, said catalyst having a Zn/Al molar ratio in the range 0.5 to 1.0 and a content of alkali metal selected from the group consisting of Na, K, Rb, Cs and mixtures thereof in the range 0.4 to 8.0 wt % based on the weight of oxidized catalyst.

2. The process according to claim 1, wherein the promoter is in the form of an alkali metal selected from the group consisting of Na, K, Rb, Cs and mixtures thereof.

* * * * *